United States Patent Office 3,565,841
Patented Feb. 23, 1971

---

3,565,841
ELASTOMER HAVING IMPROVED BUILDING TACK AND PROCESS FOR PRODUCING IT
Robert Edward Tarney, Chadds Ford, Pa., and John J. Verbanc, Wilmington, Del., assignors to E. I. du Pont de Nemours and Company, Wilmington, Del., a corporation of Delaware
No Drawing. Continuation-in-part of application Ser. No. 708,486, Feb. 27, 1968. This application Nov. 8, 1968, Ser. No. 774,494
Int. Cl. C08d 9/12
U.S. Cl. 260—27
15 Claims

ABSTRACT OF THE DISCLOSURE

An hydrocarbon elastomer is tackified by uniformly mixing with an organic cyclic resin, which has at least one polar functional group and a molecular weight of at least 200, aging the resulting mixture in the substantial absence of ozone and free-radical producing agents until a phase, different from the bulk of the mixture, forms on a surface of the mixture, followed by exposing said surface to ozone or a free radical producing agent.

PRIORITY

This application is a continuation-in-part of application Ser. No. 708,486, filed Feb. 27, 1968 now abandoned.

BACKGROUND OF THE INVENTION

Synthetic rubber-like polymers are notably deficient in building tack, which is the surface property of natural rubber which enables two pieces of unvulcanized stock to adhere when brought into contact under moderate pressure. Surprisingly enough this characteristic is peculiar to two pieces of natural rubber and neither will adhere to other substances in a like manner; for example, such adhesion does not exist between natural rubber and metal, glass or wood. Unfortunately synthetic rubber-like polymers do not exhibit good building tack and the various means heretofore devised to overcome this deficiency, including the addition of natural rubber, synthetic resins or natural products such as rosins or gums during the compounding operation are not satisfactory. Prior attempts to improve building tack of elastomers generally and EODM elastomers in particular have concentrated upon use of one or more adhesive layers to hold the polymer layers together in a sandwich-like structure. There has been a need for a means for improving the building tack of elastomers without any need to resort to stratified structures or the additional step, inherent in making such structures, of coating adhesive on the layers to be adhered.

THE INVENTION

In accordance with this invention a hydrocarbon elastomer is provided with excellent building tack by uniformly mixing with an organic cyclic resin which has at least one polar functional group and a molecular weight of at least 200, aging the resulting mixture in the substantial absence of an activating agent, such as ozone or free radical producing agent, until a phase, different from the bulk of the mixture, forms on a surface thereof, followed by exposing that surface to an activating agent, such as ozone or a free radical producing agent to produce a peel tack which is at least one pound per lineal inch more than the peel tack of the mixture before exposure.

DETAILS OF THE INVENTION

The term "building tack" (sometimes referred to herein simply as "tack") is used herein with its usual meaning as the peculiar characteristic of natural rubber which causes two fresh surfaces to adhere or coalesce. The amount of tack which an elastomer has is determined by a so-called "peel test" or "repeat test" described hereinafter.

The organic cyclic resins useful in this invention are in general isoprenoid resins, terpenoid resins or heat insensitive phenol-aldehyde resins or other compounds or resins with a molecular weight of at least about 200 and having similar functional groups and properties. The cyclic resins useful in this invention contain at least one polar functional group. The latter can be attached directly to a ring carbon or an alicyclic carbon atom or be part of a ring. Representative polar functional groups include an ethylenically unsaturated group (C=C), hydroxyl (—OH), ester (—COOR), carboxy (—COOH), amide (—CONH$_2$), amine (—NH$_2$), cyanide (—CN), thiol (—SH), aldehyde (—CHO), OXO (=O), carbonyl

and the like. The cyclic resins include condensation products such as phenol-aldehyde resins and compounds with polycyclic rings as in abietic acid and derivatives thereof. R is aliphatic or aromatic.

The terpenoid resins useful in this inventon include terpenes, rosins, modified rosins and derivatives of these which meet the criteria set forth above. The class includes hydrogenated and partially hydrogenated rosins, aromatized and polymerized rosins and derivatives thereof, containing one or more or a combination of the polar functional groups mentioned above. In such compounds the normal functional groups can be replaced with one of the functional polar groups mentioned above (e.g., abietic acid in which the carboxy group is substituted by a hydroxyl group). Rosin acids which are useful tackifiers include abietic acid, neoabietic acid, dehydroabietic acid, dihydroabietic acid, tetrahydroabietic acid, levo pimaric acid, dextro pimaric acid and isodextro pimaric acid. Dimers and derivatives of these acids containing one or more of the above functional groups, particularly the esters, can also be used.

The isoprenoid compounds useful in this invention include resinous polymers such as the Diels-Alder reaction product of isoprene with piperylene, butadiene, dicyclopentadiene or combinations thereof, the polymerization being conducted with an acid catalyst. Such polymers modified by introduction of one or more of the above-mentioned polar functional groups are preferred and carboxylated, hydroxylated and phenolated derivatives of such polymers are especially preferred. Wingtack 95 and Betaprene H, resinous polymers of the Diels-Alder reaction product of isoprene with piperylene, are commercially available polymers which are useful in this invention. Although phenol-aldehyde resins generally are useful, phenol-formaldehyde resins meeting the above criteria are particularly preferred.

An especially useful isoprenoid resin is an inter-addition polymer of an isoprenoidal codimer, as exemplified by an interdimer of isoprene and allylicly terminated cyclopentadiene, wherein the isoprenoidal codimer is about 50–90% of the final copolymer by reason of reaction (termination) with 2-methyl-butene or alpha-methyl-styrene in an amount at least equal to the amount of cyclodienes present.

In addition to the cyclic resins which appear in the examples, the following specific compounds are also useful in this invention:

Levo pimaric acid modified with maleic anhydride.
Levo pimaric acid modified with fumaric acid.

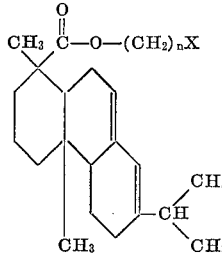

where X=—OH, —COOH, —COONH$_2$, —COONR$_2$

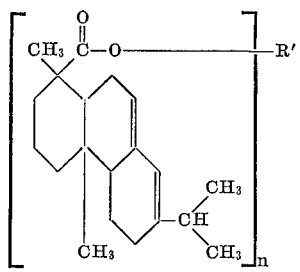

where $n$=the valence of R', and R' is CH$_3$—, C$_2$H$_5$—; CH$_2$=CH—CH$_2$1, phenyl, cyclohexyl,

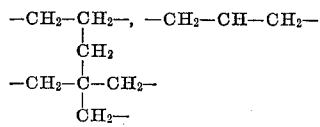

where R''=H, CH$_3$, C$_2$H$_5$, CH$_2$=CH—CH$_2$—, phenyl, cyclohexyl

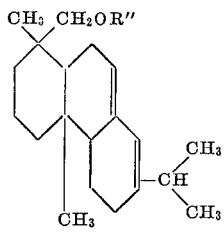

Hydroabietyl alcohol and its esters.
Resin acids modified by reaction with phenolic resins in accordance with the following type reaction:

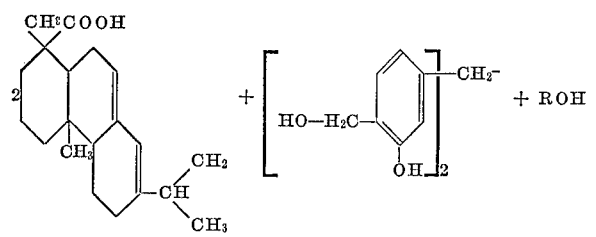 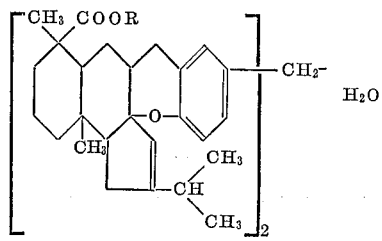

where R is an aliphatic or aromatic group.

Oil soluble terpene phenolic resins.
Hydroxylated petroleum hydrocarbon resin.
Zinc, aluminum and other heavy metal salts of the resins mentioned above, and which are known as resinates, are also useful in this invention.

The phenol-aldehyde resins useful in this invention are heat-insensitive in the sense that they are stable to change under the conditions of incorporation into the elastomer and its ultimate use.

The cyclic resins of this invention are incorporated into the hydrocarbon polymers in amounts of about 1–50 phr. (parts resin per hundred parts polymer by weight) and preferably in an amount of 2–10 phr. It is desirable to use as little cyclic resin as will provide the desired tack for economic reasons and to avoid adverse affects on curability of the polymer.

This invention is applicable to hydrocarbon elastomers generally including both natural rubbers and synthetic elastomers which comprise at least 95% polymerized hydrocarbon monomer units. The invention is particularly useful for imparting tack to sulfur curable synthetic elastomers of EODM polymers, that is, polymers of ethylene, another alpha-olefin and a diene, preferably a non-conjugated diene having only one readily polymerizable double bond, but it is also applicable to ethylene/propylene elastomers. Particularly preferred are polymers of ethylene, propylene and a non-conjugated diene (called EDPM polymers), the diene containing 6–22 carbon atoms and having only one polymerizable double bond. EODM polymers which are especially preferred are the terpolymers of ethylene, propylene and an acyclic non-conjugated diene having only one terminal double bond such as ethylene/propylene/1,4-hexadiene, but ethylene/propylene/dicyclopentadiene, ethylene/propylene/ethylidene norbornene and ethylene/propylene/methylene-2-norbornene are also very useful. Other representative sulfur-curable terpolymer elastomers are those described in U.S. 3,093,620, U.S. 3,063,973 and U.S. 2,933,480.

Other synthetic rubbers which can be effectively tackified by this invention include butadiene/styrene, butadiene and isobutylene polymers and combinations of these with natural rubber and/or EODM polymers.

The compositions of the present invention are made by mixing the elastomer and cyclic resin in any convenient manner which will produce a uniform mixture. This can be accomplished by milling on a conventional rubber mill or in a Banbury mixer. Normally the cyclic resin will exhibit significant affinity for the polymer and this facilitates the mixing which is usually accomplished in a manner of minutes. Conveniently the cyclic resin can be added to the polymer during the regular compounding operation wherein one or more other additives, curing agents, anti-oxidants, pigments, etc. are added. The latter are not necessary, however, to gain the advantages of this invention. Curing is effected by conventional methods and under the usual conditions.

One of the benefits of this invention, beyond the development of exceptional building tack in polymers which heretofore have resisted exhibiting this property, is the substantial greater plasticity of the polymer/resin mixture compared to the polymer alone. Compositions used heretofore to impart building tack to EODM polymers have actually reduced plasticity of the polymer and rendered it relatively less workable whereas the present polymer/resin compositions are more workable than the polymer alone. Thus, whereas in the past it has been necessary to plasticize EPDM polymers with oils and other agents to improve polymer workability, the present cyclic resins are plasticizers also.

Comparative plasticities are easily determined by Wallace Plasticity measurements. These are made on a Wallace Plastimeter which measures the amount of flow or deformation under load of unvulcanized elastomeric materials. In this measurement the polymer to be tested is sheeted and cut into pellets having a thickness in the range 125 mils to 300 mils. Initially, for a 10-second period, the test pellet is compressed to exactly 1 mm. in thickness and is heated to 100° C. Then the test pellet is subjected to a 10-kg. load for exactly 15 seconds at 100° C.

Following uniformly mixing the elastomer and cyclic resin, it is preferable that the mixture be aged by simply storing the mixture in a place where it is exposed to minimal ozone, ultra-violet light, or free-radical producing agents (e.g., in a dark room) for at least several minutes. The minimum aging period necessary for acceptable tack will vary with the particular polymer, tackifier and other additives and conditions, particularly oils, temperature, etc. Aging is conducted for a period long enough to permit formation on a surface of the mixture of a phase different from the composition of the bulk of the mixture. This distinct phase separation (formation) can be seen under a phase contrast microscope when the elastomer does not contain a filler obscuring it. The surface phase separation need not be a continuous or uniform layer but can be in the form of a plurality of discontinuous or non-uniform areas on the surface of the elastomer.

The appearance of a phase separation can be detected by Total Reflectance Infrared Spectroscopy which will show a change in proportions of the mixture components in local areas. In some instances aging occurs practically instantaneously or during the mixing operation so that activation can be effected immediately after mixing the polymer and cyclic resin.

After aging, the elastomer/resin mixture is activated, preferably by exposure to ozone, or to ultra-violet light (UVL) in the presence of oxygen, under controlled conditions. Ozone is a preferred activating agent. Exposure to ultra-violet light, particularly ultra-violet light filtered through ordinary window glass, is also very effective. The mixture is in contact with air or oxygen during the exposure to ultraviolet light and there is no need to prevent air or oxygen from contacting the mixture during the aging period.

Too much exposure to the activating agent can prevent the generation of building tack in the elastomer mixture and can even reduce the tack inherent in the elastomer itself. Too little exposure prolongs the time necessary to impart the desired tack. The correct exposure for a particular aged stock and exposure period can easily be determined by trial tests. The time of exposure varies inversely with the intensity of the treatment. Care is advisable because an excessive exposure period can destroy the tack initially produced by an otherwise acceptable exposure. Bright sunlight filtered through ordinary window glass is an acceptable source of UVL and normally requires an exposure of 4–8 hours although in certain cases two hours or even somewhat less provides acceptable tack. Fluorescent light is another acceptable light source. Generally more than twelve hours exposure to bright sunlight at 75° N. latitude will not be necessary and eight hours is routinely satisfactory for adequate tack generation. One half-hour exposure to light from an ultra-violet light lamp filtered through ordinary window glass provides sufficient activation of the elastomer/cyclic resin mixture to produce adequate tack. On the other hand a few seconds exposure to ozone (in the dark or in daylight or other) at a concentration of 100 parts ozone per million parts air imparts excellent tack.

In place of ozone or UVL as the activating agent for generating tack after the aging of the elastomer mixtures other free radical producing agents can be used, such as spark discharge, flame treatments, peroxides, etc. Preferably the agent is used in a manner which will provide only surface treatment of the elastomer/resin mixture and usually the latter is made into sheet form to facilitate such surface treatment. Exposure time will vary with the activating agent used. Exposure to ozone, or to daylight in the presence of oxygen or air, is the least expensive method of activation although the use of UVL lamps is practical.

Although the chemical reason for the effectiveness of this invention is not entirely understood, it is thought that the aging of the elastomer/resin mixtures permits the resin in the interior of the mixture to "bloom," that is, to at least partially migrate to the surface. The resins, then, must be materials which are sufficiently soluble in the elastomer to permit this migration during the aging period and are present in the polymer/resin mixture in a concentration which exceeds its solubility product therein. The faster the migration the shorter the aging period can be and in some cases no aging time-interval or practically none is required. The more migration occurs (longer aging) the longer will the tack be retained. It is important that the resin on the surface be in an amorphous (plasticized) condition rather than crystalline. A candidate resin which readily crystallizes on the surface of the elastomer/resin mixture after migration (aging) is not useful in this invention.

Regardless of the way in which the cyclic resin is incorporated, the period and intensity of exposure to activating agent is regulated to provide at least one pound per linear inch peel tack more than the peel tack of the elastomer without activation.

The following examples illustrate the invention. All parts, percentages and proportions are by weight unless otherwise indicated.

The base formula used to compound the elastomer (EPDM-R) and cyclic resins shown in Table I is as follows:

FORMULA A

| | |
|---|---|
| EPDM-R | 100 |
| APF black | 75 |
| Paraffinic oil | 40 |
| Zinc oxide | 5 |
| Sulfur, crystex | 1.5 |
| 2-mercaptobenzothiazole | 0.75 |
| Tetramethyl thiuram disulfide | 0.5 |
| Zinc salt of dibutyl dithiocarbonic acid | 1.5 |

Formula A and cyclic resin are compounded on a rubber mill using conventional techniques and sheeted out. Except for the elastomer, the same base recipe is used for the materials in Table II.

Following compounding and sheeting-out stock samples are stored for twelve hours in the dark and then exposed to continuous indirect sunlight filtered through ordinary window glass in Wilmington, Del. The samples are then tested for Peel Tack and Repeat Tack.

Peel tack

Test samples are formed by pressing a 6 x 3 x 0.75 inch sheet of elastomeric material (e.g., Formulas A–E) between a cotton duck backing and a polyethylene terephthalate film, to embed the cotton duck in one face, using a laboratory compression molding press, with mild pressure at a temperature of 100° C. for three minutes. Test strips ¼ inch wide are cut from the backed sheet, the film is removed, and pairs are joined by placing the elastomeric surfaces together and rolling with an 8 pound weight. Thirty seconds after joining the strips they are pulled apart in a Tensile testing machine at a draw rate of 2.5 inches/minute at 25° C. (68° F.). The peel strength is recorded in pounds per linear inch.

Repeat tack

A second method of measuring tack is designed to simulate the conditions encountered in automatic tire building equipment. Specimens are cut from either (a) the carcass fabric in 1 x ½ inch strips with the cords parallel to the long axis or (b) from fabric constructed as described under the peel tack test. One piece is mounted vertically on the face of a fixed metal block. The other piece is mounted horizontally across a similar block which can be driven into contact with the first block by an air activated cylinder. When the faces of the pieces are contacted, the contact force is measured by the pressure applied to the air cylinder. The time of contact is determined by a timing mechanism which can be set for an interval of 0.8 to 15 seconds. The air cylinder is removed at 40 p.s.i. providing a break time of about 40 milliseconds. Tack is determined as the instantaneous breaking force measured by a load-cell transducer, and a high speed recorder. The contact time, the contact pressure and the breaking force are recorded. Specific data showing the efficacy of the composition of this invention are recorded in the tables.

In the tables EPDM polymer R is a 52/44/4 (weight percent) ethylene/propylene/1,4-hexadiene terpolymer having a Mooney viscosity (ML-4/250° F.) of 70, and made by polymerizing the monomers with a premixed VOCl$_3$/diisobutyl aluminum chloride catalyst in tetrachloroethylene. This is the elastomer utilized in Table I. EPDM polymer S is a 53.5/40/6.5 (weight percent) ethylene/propylene/1,4-hexadiene terpolymer having a Mooney viscosity (ML-4/250° F.) of 70, and made by polymerizing the monomers with a premixed VOCl$_3$/diisobutyl-aluminum chloride catalyst in tetrachloroethylene.

EPDM polymer T is a 60.3/36/3.7 (weight percent) ethylene/propylene/1,4-hexadiene terpolymer having a Mooney viscosity (ML-4/250° F.) of 40 and made by polymerizing the monomers with a vanadium tris(acetylacetonate)/diisobutyl aluminum chloride catalyst in tetrachloroethylene.

EPDM polymer B is a 61/36/3 (weight percent) ethylene/propylene/1,4-hexadiene terpolymer having a Mooney viscosity (ML-4/250° F.) of 40 and prepared by polymerizing the monomers with a VCl$_4$/disobutyl aluminum chloride catalyst in tetrachloroethylene.

The hydroxylated isoprenoid resin (hydroxylated Wingtack 95) is prepared by adding a hexane solution of Wingtack 95 to performic acid and then neutralizing with sodium hydroxide.

The carboxylated isoprenoid resin (carboxylated Wingtack 95) is made by dissolving Wingtack 95 and formic acid in heptane and the solution is added to a mixture of concentrated sulfuric acid and formic acid at ice bath temperature.

The phenolated isoprenoid resin (phenolated Wingtack 95) is made by reacting the mixture Wingtack 95 and resorcinol in the presence of AlCl$_3$ and hexane.

TABLE I

| Cyclic resin | Parts per 100 weight [1] | Formula | Peel tack [2] 1 day [4] | Peel tack [2] 1 week [4] | Repeat tack [3] 1 day [4] | Repeat tack [3] 1 week [4] |
|---|---|---|---|---|---|---|
| Control, no cyclic resin [5] | 0 | A | 0.5 | 0.5 | 19.4 | 20 |
| Dehydrogenated rosin, Staybelite [6] | 10 | A | [7] 14 | [7] 16.7 | 29.5 | 13.5 |
| Nancy wood rosin | 10 | A | [7] 11.3 | 8.25 | 33.3 | 3.7 |
| Polymerized rosin (40% dimer) M.P. 102° C., polypale resin [6] | 10 | A | 4.4 | [7] 12.5 | 32 | 36 |
| Dimerized rosin, M.P. 152° C., Acid Number 140, Dymerex [6] | 10 | A | [7] 14 | [7] 15.8 | [7] 35 | [7] 36 |
| Methyl ester of rosisn, Abalyn [6] | 10 | A | [7] 10.5 | [7] 11.3 | 29 | 32.5 |
| Triethylene glycol ester of dehydrogenated rosin, Staybelite #3 [6] | 10 | A | 2.8 | 2.6 | 23 | 35 |
| Diethylene glycol ester of rosin, Flexalyn 80M | 10 | A | [7] 9.3 | [7] 10.9 | 31.2 | 5 |
| Ethylene glycol ester of polymerized rosin, Polypale ester #1 [6] | 10 | A | 2.25 | [7] 14.5 | 26 | 34 |
| Glycerol ester of dehydrogenated rosin, Staybelite ester #5 [6] | 10 | A | 1.0 | [7] 14.4 | 21 | [7] 31.6 |
| Glycerol ester of dehydrogenated rosin, Staybelite ester #10 [6] | 10 | A | 3.95 | [7] 8.45 | 33.3 | 35.9 |
| Glycerol ester of rosin, S.P. 91° C., Ester gum 8D [6] | 10 | A | [7] 13.4 | [7] 14.4 | 33 | 3.3 |
| Ethylene glycol ester of polymerized rosin, Polypale ester 10 [6] | 10 | A | 6.0 | [7] 13.7 | 31.6 | 12.6 |
| Pentaerythritol ester of hydrogenated rosin, Pentalyn H [6] | 10 | A | 1.5 | [7] 13.5 | 25 | 34 |
| Dehydroabietyl amine acetate, Rosin amine D acetate [6] | 10 | A | 1.2 | 4.1 | 29.5 | 32.9 |
| Commercial terpene resin | 10 | A | 0.7 | [7] 10 | 20 | 28.7 |
| Hydroxylated isoprenoid polymer, hydroxylated Wingtack 95 [8] | 15 | A | [7] 17.6 | 17 | 32.9 |  |
| Carboxylated isoprenoid polymer, carboxylated Wingtack 95 [8] | 10 | A | [7] 12.7 | [7] 10.9 | 24.4 | 21.5 |
| Phenolated isoprenoid polymer, phenolated Wingtack 95 [8] | 10 | A | [7] 14 | [7] 13 | 5.8 | 6.6 |

[1] Parts cyclic resin per hundred parts elastomer.
[2] Pounds per linear inch.
[3] 20 p.s.i. pressure applied 10 seconds, p.s.i. (third break values).
[4] Exposure to indirect bright sunlight through window glass.
[5] Controls containing tackifier but not activated by exposure exhibited peel tack values of 1–2.5 lb./in.
[6] Hercules Powder Company.
[7] Welded, stock broke before weld.
[8] Goodyear Tire & Rubber Company.

TABLE II

| Elastomer | Cyclic resin | Parts per 100 weight | Peel tack [1] 1 day [2] | Peel tack [1] 1 week [2] | Repeat tack [1] 1 day [2] | Repeat tack [1] 1 week [2] |
|---|---|---|---|---|---|---|
| EPDM-T | Nancy wood rosin | 10 | 2.45 | [3] 6.8 | 31.6 | 31.2 |
| EPDM-P | do | 10 | 2.1 | [3] 9.0 | 28.2 | 34.6 |
| EPDM-S | do | 10 | 1.9 | [3] 16.9 | 29.9 | 3.7 |
| EPDM-S | Dehydrogenated rosin | 10 | 1.7 | [3] 15.5 | 29.1 | 29.1 |
| EPDM-X | do | 10 | 1.75 | 3.15 |  |  |
| EPDM-Y | Nancy wood rosin | 10 | 0.9 | [4] 4.95 |  |  |
| EPDM-Y | Dehydrogenated rosin | 10 | 0.5 | [4] 6.5 |  |  |
| EPDM-Z | do | 10 | 1.7 | 2.8 |  |  |

[1] Pounds per linear inch.
[2] Exposure to indirect bright sunlight through window glass.
[3] Welded, stock broke before weld.
[4] End weld.

NOTE:
EPDM-X is a commercial 52.8/43/4.2 (weight percent) ethylene/propylene/ethylidene norbornene elastomer containing 1 phr. tris(nonyl phenyl phosphite).
EPDM-Y is a commercial 66.6/29/4.4 weight percent) ethylene/propylene/dicyclopentadiene terpolymer with a Mooney viscosity (ML-4/250° F.) of 73.
EPDM-Z is a commercial 53.2/43/3.8 (weight percent) ethylene/propylene/methylene norbornene terpolymer having a Mooney viscosity (ML-4/250° F.) of 73.

TABLE III

| Elastomer | Formula | Peel tack,[1] 1 day[2] |
|---|---|---|
| SBR 1502[1] | B, cyclic resin | [3] 5.1 |
| | C, no cyclic resin | nil |
| | D, cyclic resin | 4.6 |
| | E, no cyclic resin | 3.1 |

[1] Pounds per linear inch.
[2] Exposure to indirect bright sunlight through window glass.
[3] Welded, stock broke before weld.

Formulas B, C, D and E in Table III are as follows:

| | B | C | D | E |
|---|---|---|---|---|
| SBR 1502[1] | 75 | 75 | 100 | 100 |
| Reclaim rubber | 50 | 50 | 0 | 0 |
| FEF black | 20 | 20 | 20 | 20 |
| SRF black | 15 | 15 | 15 | 15 |
| Circosol light oil | 5 | 5 | 5 | 5 |
| Dimerized rosin | 5 | 0 | 5 | 0 |
| Zinc oxide | 4 | 4 | 4 | 4 |
| Stearic acid | 1 | 1 | 1 | 1 |
| n-Cyclohexyl-2-benzothiazoylsulfenamide | 1.2 | 1.2 | 1.2 | 1.2 |
| Diphenyl guanidine | 0.5 | 0.5 | 0.5 | 0.5 |
| Sulfur, crystex | 2 | 2 | 2 | 2 |
| Polymerized 1,2-dihydro-2,2,4-trimethyl-quinoline | 2 | 2 | | |

[1] A 25/75 (weight percent) butadiene/styrene copolymer made at 6° C. by free-radical emulsion polymerization.

Ozone activation

An automobile tire carcass stock is compounded on a rubber roll mill by adding 10 phr. of dimerized rosin acid, M.P. 152° C. and acid number 140 ("Dymerex") to a stock compounded from EPDM-R according to Formula A. For purpose of comparison a control is made without the resin acid. Slabs (6-inch x ¼-inch x 0.75-inch) are cut and allowed to age in the dark at room temperature for about 24 hours. Then the slabs are subjected to static exposure to ozone for various lengths of time. Table IV below gives the peel strengths of the exposed stocks.

TABLE IV

| P.p.m. ozone[1] | Time of exposure | Peel tack[2] |
|---|---|---|
| [3] 0 | | 1.4 |
| 0.3 | 15 minutes | 4.05 |
| 0.3 | 30 minutes | 4.75 |
| 0.3 | 60 minutes | [4] 7.0 |
| 0.3 | 6 hours | 2.25 |
| 3 | 1 minute | 1.48 |
| 3 | 5 minutes | [5] 5.45 |
| 3 | 15 minutes | [5] 6.85 |
| 3 | 60 minutes | [4] 6.7 |
| 3 | 8 hours | nil |
| 100 | 1 minute | [5] 16.9 |
| 100 | 5 minutes | [4] 8.4 |
| 100 | 16 minutes | [4] 12.3 |
| 100 | 60 minutes | 4.6 |
| 100 | 8 hours | Nil |

[1] Parts ozone per million parts air.
[2] Pounds per linear inch.
[3] Control.
[4] Sample welded after being partly peeled.
[5] Sample welded, peel value is stock strength.

We claim:

1. A synthetic hydrocarbon elastomer, which is an ethylene/propylene/diene polymer, a butadiene/styrene polymer, a butadiene polymer, or an isobutylene polymer, tackified by
   (a) uniformly mixing the elastomer with an organic cyclic resin having at least one polar functional group and a molecular weight of at least 200, said resin being selected essentially from the group consisting essentially of heat insensitive phenol aldehyde resins, terpenoid resins which are terpenes, rosins, modified rosins, and isoprenoid resins which are resinous polymers of the Diels-Alder reaction product of isoprene with piperylene, butadiene, dicyclopentadiene or combinations thereof,
   (b) aging the mixture in the practical absence of an activating agent until a phase, different from the bulk of the mixture, forms on the surface of the mixture, and
   (c) exposing said surface to ozone or to ultraviolet light in the presence of oxygen to produce a peel tack which is at least one pound per linear inch more than the peel tack of the mixture before exposure.
2. The composition of claim 1 in which the elastomer/cyclic resin mixture is aged in the dark under normal room atmospheric conditions.
3. The composition of claim 1 in which the activating agent in step (c) is ozone.
4. The composition of claim 1 in which the activating agent of step (c) is ultra-violet light in conjunction with oxygen or air.
5. The composition of claim 1 wherein the resin is a carboxylated, hydroxylated or phenolated derivative of resinous polymers of the Diels-Alder reaction of isoprene with piperylene, butadiene, dicyclopentadiene or combination thereof.
6. The composition of claim 1 in which the elastomer is a polymer of ethylene, a $C_3$–$C_8$ alpha-olefin and a $C_6$–$C_{22}$ diene.
7. The composition of claim 6 in which the elastomer is a polymer of ethylene, propylene, and a $C_6$–$C_{22}$ non-conjugated diene.
8. The composition of claim 7 in which the elastomer is an ethylene/propylene/1,4-hexadiene polymer.
9. The composition of claim 6 in which the activating agent in step (c) is ozone.
10. The composition of claim 6 in which the activating agent is ultra-violet light in conjunction with oxygen or air.
11. The composition of claim 7 in which the activating agent of step (c) is a free radical producing substance.
12. The composition of claim 1 wherein the synthetic elastomer is in combination with natural rubber.
13. The composition of claim 1 wherein a butadiene/styrene polymer, a butadiene polymer, or an isobutylene polymer is in combination with an ethylene/propylene/diene polymer.
14. The composition of claim 13 in combination with natural rubber.
15. The composition of claim 1 wherein the resin is the ethylene glycol ester of polymerized rosin.

References Cited

UNITED STATES PATENTS

| | | | |
|---|---|---|---|
| 3,008,920 | 11/1961 | Urchick | 204—160.1 |
| 3,226,312 | 12/1965 | Lamm et al. | 204—160.1 |
| 3,331,804 | 7/1967 | Fogiel | 260—25 |
| 3,402,140 | 9/1968 | Bickel et al. | 260—24 |

FOREIGN PATENTS

| | | | |
|---|---|---|---|
| 404,120 | 1/1934 | Great Britain | 204—160.1 |

OTHER REFERENCES

Skeish, I: "Handbook of Adhesives," 1962, pp. 196 to 204 relied on.

Houwink: "Adhesion and Adhesives," 1965, pp. 375 to 384 relied on.

HOSEA E. TAYLOR, Primary Examiner

W. E. PARKER, Assistant Examiner

U.S. Cl. X.R.

214—160.1; 260—4, 846, 876

PO-1050
(5/69)

UNITED STATES PATENT OFFICE
CERTIFICATE OF CORRECTION

Patent No. __3,565,841__   Dated __February 23, 1971__

Inventor(s) __ROBERT EDWARD TARNEY and JOHN J. VERBANC__

It is certified that error appears in the above-identified patent and that said Letters Patent are hereby corrected as shown below:

Column 3, line 32, change "$CH_2=CH-CH_2l$" to -- $CH_2=CH-CH_2$ lines 39 and 40, "where R"=H, $CH_3$, $C_2H_5$, $CH_2=CH-CH_2-$, phenyl, cyclohex should follow the formula rat than precede it.

Signed and sealed this 19th day of October 1971.

(SEAL)
Attest:

EDWARD M. FLETCHER, JR.
Attesting Officer

ROBERT GOTTSCHALK
Acting Commissioner of Pate